INVENTOR
JOHN SIKORCIN
BY Werner A. Witt

ATTORNEYS

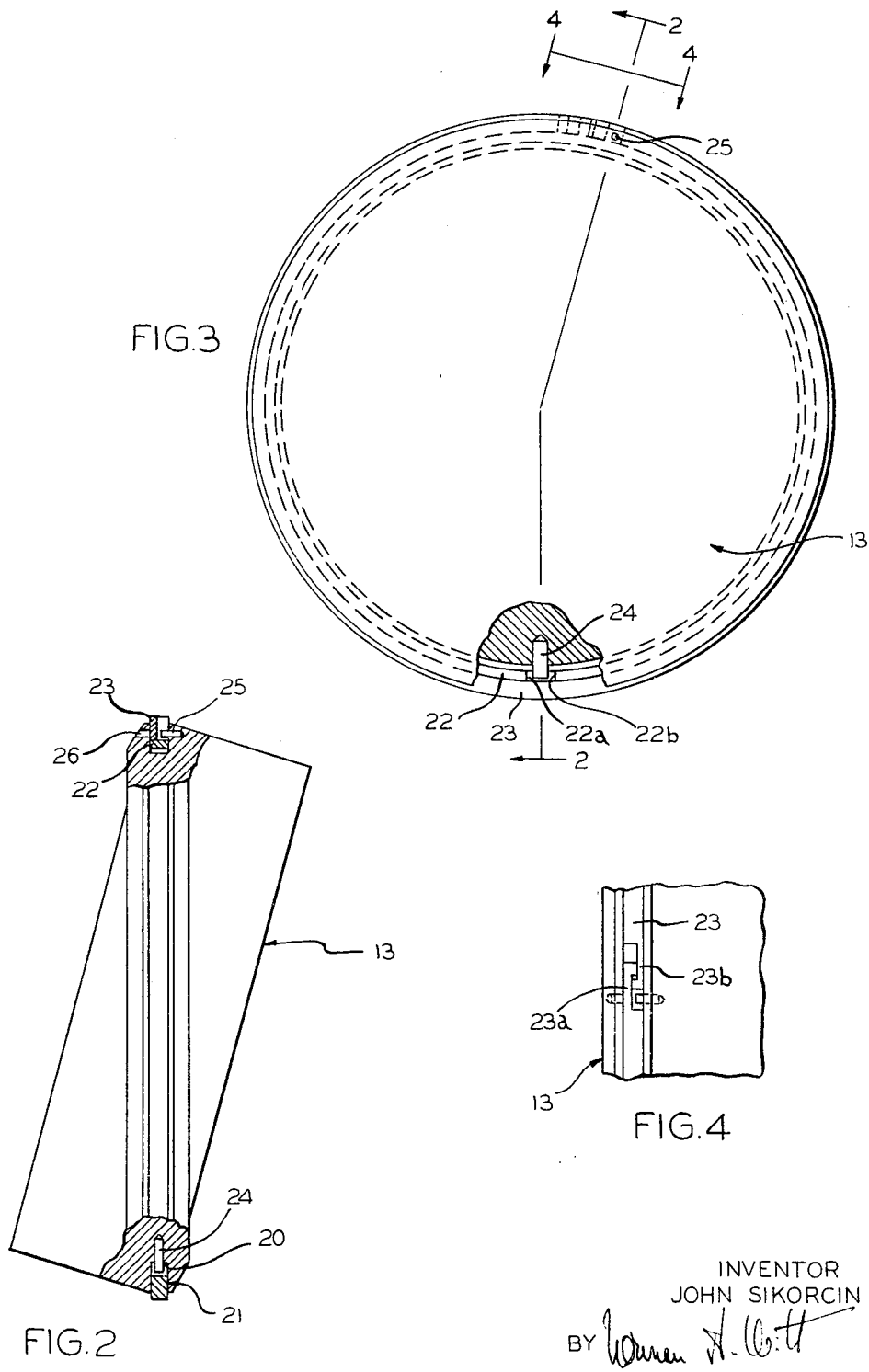

United States Patent Office 3,508,737
Patented Apr. 28, 1970

1

3,508,737
SEALING RING RETAINMENT AND ADAPTATION TO A BUTTERFLY VALVE
John Sikorcin, Elmhurst, Ill., assignor to Vapor Corporation, Chicago, Ill., a corporation of Delaware
Filed Jan. 19, 1968, Ser. No. 699,071
Int. Cl. F16k 1/228; F16j 9/24
U.S. Cl. 251—306                    3 Claims

ABSTRACT OF THE DISCLOSURE

Butterfly valve including means for retaining a commercially available restrained gap two piece sealing ring set in a butterfly disc groove. First and second circumferentially spaced pins extend from the disc and into open areas of the rings to retain the rings in fixed relation to the disc.

---

This invention relates in general to a butterfly valve, and more particularly to a sealing method and means for the butterfly valve disc, and still more particularly to a method and means for retaining a sealing ring set on a butterfly valve disc.

Heretofore, butterfly valves for controlling the flow of fluids and gases have taken many different forms, all of which generally include a cylindrical sealing bore coacting with a rotatable butterfly disc with sealing ring means on the disc or in the bore. Further, a restrained gap two piece sealing ring set has been heretofore commercially available.

The present invention involves the adaptation of the heretofore commercially available restrained gap two piece sealing ring set to a butterfly valve. Problems experienced in merely mounting such a sealing ring set to a circumferential groove of a butterfly valve disc include excessive leakage and dislodging of the outer ring from the groove. The ring set includes an inner split ring having a straight gap and an outer ring having hooked end portions at the gap that restrain expansion of the ring. Heretofore, during valve operation, the inner seal ring rotated within the outer seal ring until both ring gaps were adjacent to each other and formed a disc leakage path that resulted in highly excessive leakage. Another problem occurred when the outer seal ring rotated, during valve operation, to a certain position whereby only one end of the ring at the gap was maintained in the butterfly groove by the valve body bore. The other end of the ring was permitted to move radially in the groove, become disengaged from its mating hooked end and leave the groove. This resulted in the free end of the outer sealing ring lodging between the butterfly disc outside diameter and the valve body bore, thereby preventing full closing of the valve.

The aforesaid difficulties were eliminated by the retainment means and method of the present invention. A means is first provided to mechanically maintain the inner seal ring gap in a predetermined orientation so as to prevent formation of a direct leakage path along the inner and outer seal ring gaps. Means was further provided to mechanically maintain the outer seal ring gap in a predetermined orientation on the butterfly valve disc to insure that both ends of the outer seal rings are always maintained captive in the disc groove by the valve body bore, during all positions assumed by the butterfly disc in the course of normal operation of the valve.

Accordingly, it is an object of the present invention to provide a means of retaining and adapting a commercially available restrained gap two piece sealing ring set to a butterfly valve.

Another object of this invention is in the provision of a butterfly valve employing a restrained gap two piece sealing ring set including inner and outer sealing rings, wherein means is provided to mechanically maintain the inner seal ring gap in a predetermined orientation relative to the outer seal ring gap to control leakage.

A further object of this invention is in the provision of a butterfly valve employing a restraining gap two piece sealing ring set, wherein means is provided to mechanically maintain the outer seal ring gap in a predetermined orientation so that both ends of the outer seal ring are always maintained captive by the valve body bore in the butterfly groove during all normal operating positions of the butterfly.

Other objects, features and advantages of the invention will be apparent from the following detailed disclosure, taken in conjunction with the accompanying sheets of drawings, wherein like reference numerals refer to like parts, in which:

FIG. 2 is a detailed partially sectional view taken substantially along line 2—2 of FIG. 3;

FIG. 3 is a vertical plan view of the valve disc, with some parts in dotted and other parts broken away to illustrate the method and means of retainment according to the present invention; and FIG. 4 is a fragmentary view of the disc taken substantially along line 4—4 of FIG. 3.

Figure 1:
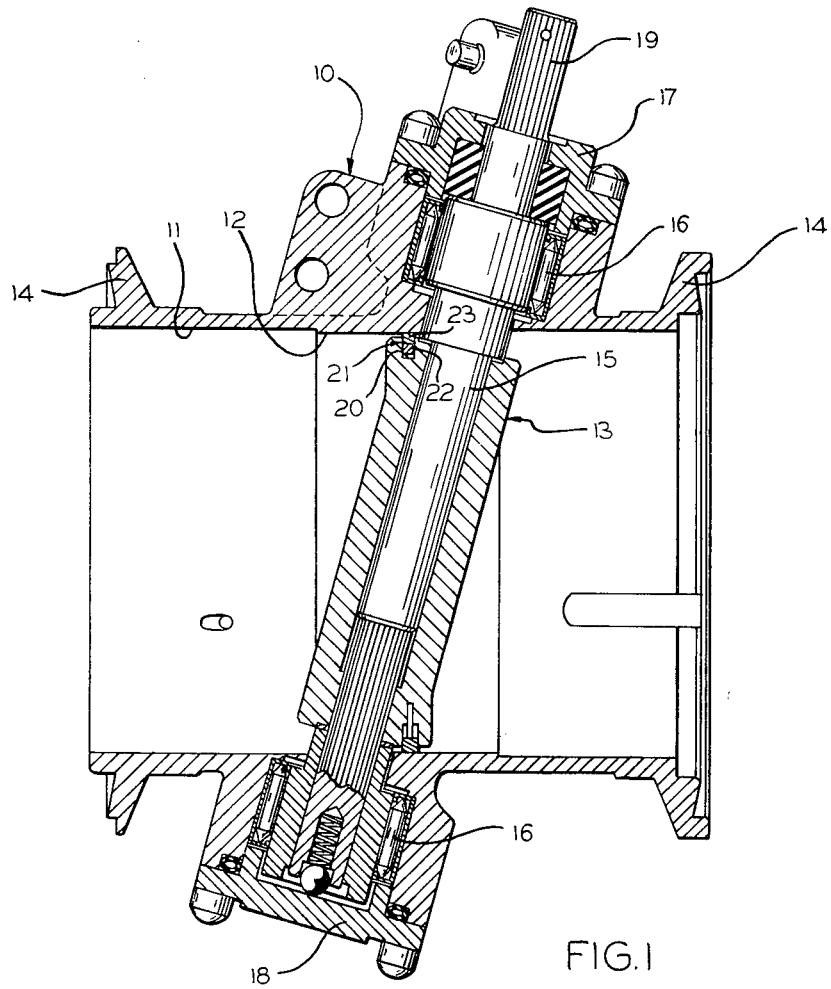
FIG. 1 is an axial sectional view taken through a butterfly valve having a commercially available sealing ring set retained according to the present invention.

Referring now to the drawings, and particularly to FIG. 1, a butterfly valve of the conventional type is shown to which the present invention may be employed, which includes a valve body 10 having a cylindrical valve body bore 11. A valve body bore sealing section 12 is provided along the bore and in which a butterfly valve disc 13 rotates to control fluid flow through the valve. Fittings 14 at opposite ends of the body facilitate connection of the body to suitable conduits. One end of the bore may be an inlet while the other end may be an outlet, and the valve disc 13 will control flow as it is rotated between open and closed positions.

The valve disc 13 is mounted on a valve shaft 15 which is suitably bearingly supported at opposite ends such as by the illustrated needle bearings 16 that are held in place by end caps 17 and 18. It should be appreciated that any suitable bearing arrangement may be provided. The shaft 15 is suitably splined to the valve disc 13 so that rotational power applied to the outer free end 19 will cause rotation of the valve disc 13. Rotational power may be supplied by wrench or an actuator.

A circumferential groove 20 is provided in the valve disc to receive a sealing ring set 21. The valve as thus far described is conventional.

The sealing ring set 21 includes an inner sealing ring 22 and an outer sealing ring 23. The inner sealing ring is provided with a straight gap defined between the outer ends 22a and 22b as seen particularly in FIG. 3 thereby defining a first open area in the ring set. The outer sealing ring ends have hooked portions 23a and 23b at its gap which function here to overlap and restrain expansion of the outer sealing ring and define second open areas in the ring set. The sealing ring set including the inner and outer sealing rings is commercially available and is primarily intended for low leakage piston seal applications where the hooked gap is intended to effect a leakage seal rather than to restrict ring expansion. By utilizing the hooked gap to restrict ring expansion and maintaining a predetermined inner-ring, outer-ring butterfly orientation, this sealing ring set, as applied to a butterfly valve, enhances valve operation. The invention results in low leakages, and by using the hooked gap ring, valve operating torque requirements can be minimized by controlling the ring expansion, thereby permitting physically smaller and lighter actuators to be used for operating the valve.

In order to effectively employ the two piece restrained gap sealing ring set, means is provided for mechanically maintaining the inner seal ring gap in predetermined orientation relative to the outer seal ring gap to control leakage, and to mechanically maintain the outer seal ring gap in predetermined orientation relative to the butterfly disc so that both ends of the outer seal ring are always maintained captive by the valve body bore sealing section in the groove 20 during all normal rotary operating positions of the valve disc 13. This means includes a radially extending first retaining pin 24 secured in the disc 13 and extending between the gap or first open area of the inner ring 22, as especially seen in FIGS. 2 and 3, and a second retaining pin 25 secured in the disc 13 in circumferentially spaced relation to the first pin and extending into a second open area of the hooked end portions of the outer sealing ring 23, as seen particularly in FIGS. 2, 3 and 4. The pin 25 extends axially to the sealing ring set 21. A retaining pin access hole 26 is provided in the disc (FIG. 2) to facilitate insertion of the pin 25. The pin 25 also extends in superimposed relationship to the inner sealing ring 22 as seen particularly in FIG. 2. As seen in FIG. 3, the relative positions of the pins 24 and 25 are shown with respect to the valve shaft axis which is along the vertical and coaxial with the pin 24.

It will be understood that modifications and variations may be effected without departing from the scope of the novel concepts of the present invention.

The invention is hereby claimed as follows:

1. A butterfly valve comprising a body having a cylindrical sealing bore, a valve disc rotatably mounted in said body bore and having a circumferential groove receiving a sealing ring set, said ring set including an inner split sealing ring having a first open area and an outer split sealing ring concentric to the inner ring having at least one second open are between overlapping expansion restraining hooked ends, a first pin extending from said disc and into the first open area of the inner ring to prevent rotation of the inner ring relative the disc, and a second pin extending from said disc at a point therealong circumferentially spaced from said first pin and into a said second open area of said outer ring to prevent rotation of the outer ring relative the disc, whereby the inner and outer open areas are circumferentially displaced.

2. A butterfly valve as defined in claim 1, wherein the outer ring open area is restrained at a position to always maintain the ends of the outer ring captive within the groove by said sealing bore during all normal rotary operating positions of the disc.

3. A butterfly valve as defined in claim 1, wherein said first pin extends radially of the inner ring, and said second pin extends axially of the outer ring.

References Cited

UNITED STATES PATENTS

| | | | |
|---|---|---|---|
| 1,392,308 | 10/1921 | Doyle et al. | 277—137 |
| 1,489,464 | 4/1924 | Small | 277—220 XR |
| 1,671,069 | 5/1928 | De Wein | 251—305 XR |
| 1,777,501 | 10/1930 | Niethamer | 277—137 |
| 1,847,731 | 3/1932 | Solenberger | 277—136 |
| 2,759,778 | 8/1956 | Anderson | 277—220 XR |
| 2,840,338 | 6/1958 | Shaw | 251—306 |
| 2,843,353 | 7/1958 | Marden | 251—192 |

HENRY T. KLINKSIEK, Primary Examiner

U.S. Cl. X.R.

277—136